US012702964B2

(12) United States Patent
Hofstatter et al.

(10) Patent No.: US 12,702,964 B2
(45) Date of Patent: Aug. 11, 2026

(54) REACTOR FOR CARRYING OUT A CHEMICAL REACTION

(71) Applicants: LINDE GMBH, Pullach (DE); BASF SE, Ludwigshafen (DE)

(72) Inventors: Martin Hofstatter, Munich (DE); Clara Delhomme-Neudecker, Munich (DE); Heinz Posselt, Bad Aibling (DE); Mathieu Zellhuber, Martinsried (DE)

(73) Assignees: Linde GmbH, Pullach (DE); BASF SE, Ludwigshafen (DE)

( * ) Notice: Subject to any disclaimer, the term of this patent is extended or adjusted under 35 U.S.C. 154(b) by 682 days.

(21) Appl. No.: 18/251,728

(22) PCT Filed: Sep. 9, 2021

(86) PCT No.: PCT/EP2021/074856

§ 371 (c)(1),
(2) Date: May 4, 2023

(87) PCT Pub. No.: WO2022/096180

PCT Pub. Date: May 12, 2022

(65) Prior Publication Data

US 2024/0100498 A1 Mar. 28, 2024

(30) Foreign Application Priority Data

Nov. 6, 2020 (EP) .................................... 20206147

(51) Int. Cl.

*B01J 19/24* (2006.01)
*B01J 19/00* (2006.01)
*H05B 3/42* (2006.01)

(52) U.S. Cl.

CPC ......... *B01J 19/243* (2013.01); *B01J 19/0013* (2013.01); *H05B 3/42* (2013.01);

(Continued)

(58) Field of Classification Search

CPC .... B01J 8/067; B01J 19/0013; B01J 19/2425; B01J 19/243; B01J 19/2445;

(Continued)

(56) References Cited

U.S. PATENT DOCUMENTS 1,985,680 A 12/1934 Mapes
5,000,926 A * 3/1991 Murayama ............... B01J 8/067 422/198

(Continued)

FOREIGN PATENT DOCUMENTS

CN 101150894 A 3/2008
CN 201565295 U 9/2010

(Continued)

OTHER PUBLICATIONS

Notice of Opposition received in Application No. EP21719925.6, dated Jul. 25, 2024.

(Continued)

*Primary Examiner* — Dapinder Singh
(74) *Attorney, Agent, or Firm* — Avek IP, LLC

(57) ABSTRACT

A reactor for carrying out a chemical reaction includes a reactor wall and at least one group of M reaction tubes, each of which has an electrically heatable heating section that extends between a first and a second removal region. Each heating section has a respective feed region in a region which extends over 20% to 80% of a heating length of the heating section and electrically conductive feed elements. Each group M is paired with the feed elements connected to the feed regions of the group, and different phases of the alternating current can be fed to different feed elements paired with a group. Each group is paired with M first and M second removal elements connected to the first or second removal regions of the group, respectively. Each group is paired with a first and a second star bridge.

20 Claims, 3 Drawing Sheets

(52) U.S. Cl.
CPC ................. *B01J 2219/00135* (2013.01); *B01J 2219/0015* (2013.01)

(58) Field of Classification Search
CPC ...... B01J 2208/0415; B01J 2219/00135; B01J 2219/0015; H05B 3/42
See application file for complete search history.

(56) References Cited

U.S. PATENT DOCUMENTS

| | | | |
|---|---|---|---|
| 5,204,071 | A | 4/1993 | Carter et al. |
| 5,270,016 | A | 12/1993 | Alagy et al. |
| 6,191,332 | B1 | 2/2001 | Duee et al. |
| 6,296,814 | B1 | 10/2001 | Bonk et al. |
| 6,423,279 | B1 | 7/2002 | Warren |
| 7,371,361 | B2 * | 5/2008 | Singh ....................... B01J 8/067 423/655 |
| 7,462,209 | B2 * | 12/2008 | Berggren ............... B01J 8/0496 48/197 R |
| 7,667,072 | B2 * | 2/2010 | Yada ...................... B01J 8/0085 562/545 |
| 7,846,417 | B2 * | 12/2010 | Singh .................... C01C 1/0482 562/512 |
| 9,347,596 | B2 | 5/2016 | Wortmann et al. |
| 9,908,091 | B2 | 3/2018 | Vogel et al. |
| 10,106,406 | B2 | 10/2018 | Finnerty et al. |
| 2004/0015012 | A1 | 1/2004 | Hammon et al. |
| 2006/0089519 | A1 | 4/2006 | Stell et al. |
| 2010/0105944 | A1 | 4/2010 | Buturla et al. |
| 2012/0241677 | A1 | 9/2012 | Perkins et al. |
| 2012/0328269 | A1 | 12/2012 | Ellinger et al. |
| 2014/0134066 | A1 | 5/2014 | de Munck et al. |
| 2014/0238523 | A1 | 8/2014 | Wortmann et al. |
| 2015/0010467 | A1 | 1/2015 | Ito et al. |
| 2015/0122802 | A1 | 5/2015 | Zikeli et al. |
| 2016/0288074 | A1 | 10/2016 | Vogel et al. |
| 2018/0208525 | A1 | 7/2018 | Schoonebeek et al. |
| 2019/0002389 | A1 * | 1/2019 | Horstmann ............ B01D 3/143 |
| 2020/0299131 | A1 * | 9/2020 | Finnerty ............. H01M 8/0618 |
| 2021/0071007 | A1 | 3/2021 | Hardman et al. |
| 2021/0179948 | A1 | 6/2021 | Kochendoerfer et al. |
| 2023/0115461 | A1 | 4/2023 | Zellhuber et al. |
| 2023/0116690 | A1 | 4/2023 | Posselt et al. |
| 2023/0211305 | A1 | 7/2023 | Hofstätter et al. |
| 2023/0226511 | A1 | 7/2023 | Hofstätter et al. |
| 2023/0285929 | A1 | 9/2023 | Posselt et al. |
| 2023/0302426 | A1 | 9/2023 | Zellhuber et al. |
| 2023/0356176 | A1 | 11/2023 | Lang et al. |
| 2023/0398513 | A1 | 12/2023 | Hofstatter et al. |
| 2024/0100498 | A1 | 3/2024 | Hofstatter et al. |
| 2024/0123421 | A1 | 4/2024 | Zellhuber et al. |
| 2024/0207811 | A1 | 6/2024 | Zellhuber et al. |

FOREIGN PATENT DOCUMENTS

| | | | |
|---|---|---|---|
| CN | 106132530 | A | 11/2016 |
| CN | 208878600 | U | 5/2019 |
| CN | 111483978 | A | 8/2020 |
| CN | 111578710 | A | 8/2020 |
| CN | 112265962 | A | 1/2021 |
| CN | 112368235 | A | 2/2021 |
| DE | 2362628 | A1 | 6/1975 |
| DE | 102006054156 | A1 | 5/2008 |
| DE | 102011077970 | A1 | 12/2012 |
| DE | 102015004121 | A1 | 10/2016 |
| DE | 102018213463 | A1 | 2/2020 |
| DE | 102018132736 | A1 | 6/2020 |
| EP | 0399833 | A1 | 11/1990 |
| EP | 0792683 | A2 | 9/1997 |
| EP | 1043367 | A1 | 10/2000 |
| EP | 1273552 | A2 | 1/2003 |
| EP | 2805762 | A1 | 11/2014 |
| EP | 3075704 | A1 | 10/2016 |
| EP | 3153466 | A1 | 4/2017 |
| EP | 3862076 | A1 | 8/2021 |
| EP | 3900817 | A1 | 10/2021 |
| EP | 4056892 | A1 | 9/2022 |
| JP | S49010026 | A | 1/1974 |
| JP | S5223246 | A | 2/1977 |
| JP | S57144840 | A | 9/1982 |
| JP | S6099951 | A | 6/1985 |
| JP | S60191444 | A | 9/1985 |
| JP | H05317843 | A | 12/1993 |
| JP | H06104187 | A | 4/1994 |
| JP | H1053775 | A | 2/1998 |
| JP | H1094727 | A | 4/1998 |
| JP | H11130541 | A | 5/1999 |
| JP | 2001106502 | A | 4/2001 |
| JP | 2006261362 | A | 9/2006 |
| JP | 2008221093 | A | 9/2008 |
| JP | 2009526734 | A | 7/2009 |
| JP | 2011258392 | A | 12/2011 |
| JP | 2013008677 | A | 1/2013 |
| JP | 2013067537 | A | 4/2013 |
| JP | 2016087512 | A | 5/2016 |
| JP | 2017532712 | A | 11/2017 |
| PL | 175410 | B1 | 5/1995 |
| RU | 2025054 | C1 | 12/1994 |
| RU | 2173213 | C1 | 9/2001 |
| WO | 1997015983 | | 5/1997 |
| WO | 2004091773 | A1 | 10/2004 |
| WO | 2015069762 | A2 | 5/2015 |
| WO | 2015123578 | A1 | 8/2015 |
| WO | 2015197181 | A1 | 12/2015 |
| WO | 2017072057 | A1 | 5/2017 |
| WO | 2019133215 | A1 | 7/2019 |
| WO | 2019228798 | A1 | 12/2019 |
| WO | 2020002326 | A1 | 1/2020 |
| WO | 2020035575 | A1 | 2/2020 |
| WO | 2022214622 | A1 | 10/2022 |

OTHER PUBLICATIONS

Substantive examination report with English description, dated Aug. 15, 2024, 10 pages, issued in Saudi Arabia Application No. 523450274.

Waitz and Wubben "Resistance heated furnaces for protective gas and vacuum operation" from Heat Processing (9), Issue 1, 2011, p. 29-38.

Office Action and Search Report issued Nov. 28, 2025 in Chinese Application No. 202180073740.6, 7 pages.

Decision to Grant a Patent dated Nov. 11, 2025, issued in JP Patent Application No. 2023-526350.

Wilson, Expanding Mechanical Design and Fabrication Horizons, John Hopkins APL Technical Digest, vol. 21, No. 4 (Year: 2000).

International Search Report and Written Opinion issued in related App. No. PCT/EP2021/074856, mailed Dec. 1, 2021.

Badini, C. and Laurella, F., Oxidation of FeCrAl alloy: influence of temperature and atmosphere on scale growth rate and mechanism, Surface and Coatings Technology, 2001, vol. 135, Issues 2-3, 291-298.

Office Action issued Apr. 7, 2026 in JP Application No. 2023-547828, 5 pages.

Office Action issued Apr. 7, 2026 in JP Application No. 2023-561056, 3 pages.

* cited by examiner

REACTOR FOR CARRYING OUT A CHEMICAL REACTION

CROSS-REFERENCE TO RELATED APPLICATIONS

This application is the national phase of, and claims priority to, International Application No. PCT/EP2021/074856, filed 9 Sep. 2021, which claims priority to EP Application No. 20206147.9, filed 6 Nov. 2020.

FIELD OF THE INVENTION

The invention relates to a reactor for carrying out a chemical reaction in a process fluid using multiphase alternating current in order to heat the process fluid.

BACKGROUND

In a series of processes in the chemical industry, reactors are used in which one or more reactants are conducted through heated reaction tubes and are catalytically or non-catalytically converted there. The heating serves in particular to overcome the activation energy requirement for the chemical reaction taking place. The reaction can proceed endothermically overall or exothermically after overcoming the activation energy requirement. The invention relates in particular to strongly endothermic reactions.

Examples of such processes are steam cracking, different reforming processes, in particular steam reforming, dry reforming (carbon dioxide reforming), mixed reforming processes, processes for dehydrogenating alkanes and the like. In steam cracking, the reaction tubes are guided through the reactor in the form of tube coils, which have at least one U-bend in the reactor, whereas tubes which typically extend through the reactor without U-bends are used in steam reforming.

The invention is suitable for all such processes and embodiments of reaction tubes. Merely illustratively, reference is made to the articles "Ethylene," "Gas Production," and "Propenes" in Ullmann's Encyclopedia of Industrial Chemistry, for example the publications of Apr. 15, 2009, DOI: 10.1002/14356007.a10_045.pub2, of Dec. 15, 2006, DOI: 10.1002/14356007.a12_169.pub2, and of Jun. 15, 2000, DOI: 10.1002/14356007.a22_211.

The reaction tubes of corresponding reactors are conventionally heated by using burners. The reaction tubes are guided through a combustion chamber in which the burners are also arranged.

Currently, the demand for synthesis gas and hydrogen, which are produced without or with reduced local carbon dioxide emissions, is rising. However, processes in which fired reactors are used cannot meet this demand on the basis of the burning of typically fossil energy carriers. Other processes are rejected due to high costs, for example. The same also applies to the provision of olefins and/or other hydrocarbons by steam-cracking or dehydrogenating alkanes. In such cases too, there is a desire for processes which emit lower amounts of carbon dioxide at least on site.

WO 2015/197181 A1 discloses a reactor in which a fluid flowing through a pipeline is heated, wherein the electrically conductive pipeline is connected to multiple phases of an alternating current source such that star point circuit is formed and heat is generated according to the electrical resistance of the pipeline.

In terms of design, the heated tube length and thus also the ohmic resistance are limited. The result is a power supply at high current intensity and low voltage in order to be able to introduce the required heating power into the pipeline, such that high-current feeds that are complex in terms of mechanics and materials are required.

SUMMARY

According to an embodiment of the invention, a reactor for carrying out a chemical reaction in a process fluid using multiphase alternating current in order to heat the process fluid, wherein the alternating current has a number M of phases, wherein M is an integer greater than one includes a reactor vessel formed by a thermally insulating reactor wall. The reactor further includes at least one group having multiple reaction tubes. Each group comprises M reaction tubes, each of which has an electrically heatable heating section that extends between a first and a second removal region of the respective reaction tube for a respective heating length. The heating sections are arranged at least for 95% of their heating length within the reactor vessel and each have a feed region in a region which extends over 20% to 80% of the heating length of said heating section. The reactor has electrically conductive feed elements. Each group of reaction tubes is paired with feed elements which are electrically conductively connected to the feed regions of the group, and different phases of the alternating current can be fed to different feed elements paired with a respective group. Each group is further paired with M first removal elements and M second removal elements which are electrically conductively connected to the first removal regions or second removal regions of the group. Finally, the reactor includes at least one electrically conductive first star bridge and at least one electrically conductive second star bridge. Each group is paired with a respective first and second star bridge. For each group, the first removal elements paired with the group are electrically conductively connected to the first star bridge paired with the group, and the second removal elements paired with the group are electrically conductively connected to the second star bridge paired with the group.

WRITTEN DESCRIPTION

Figure 1:
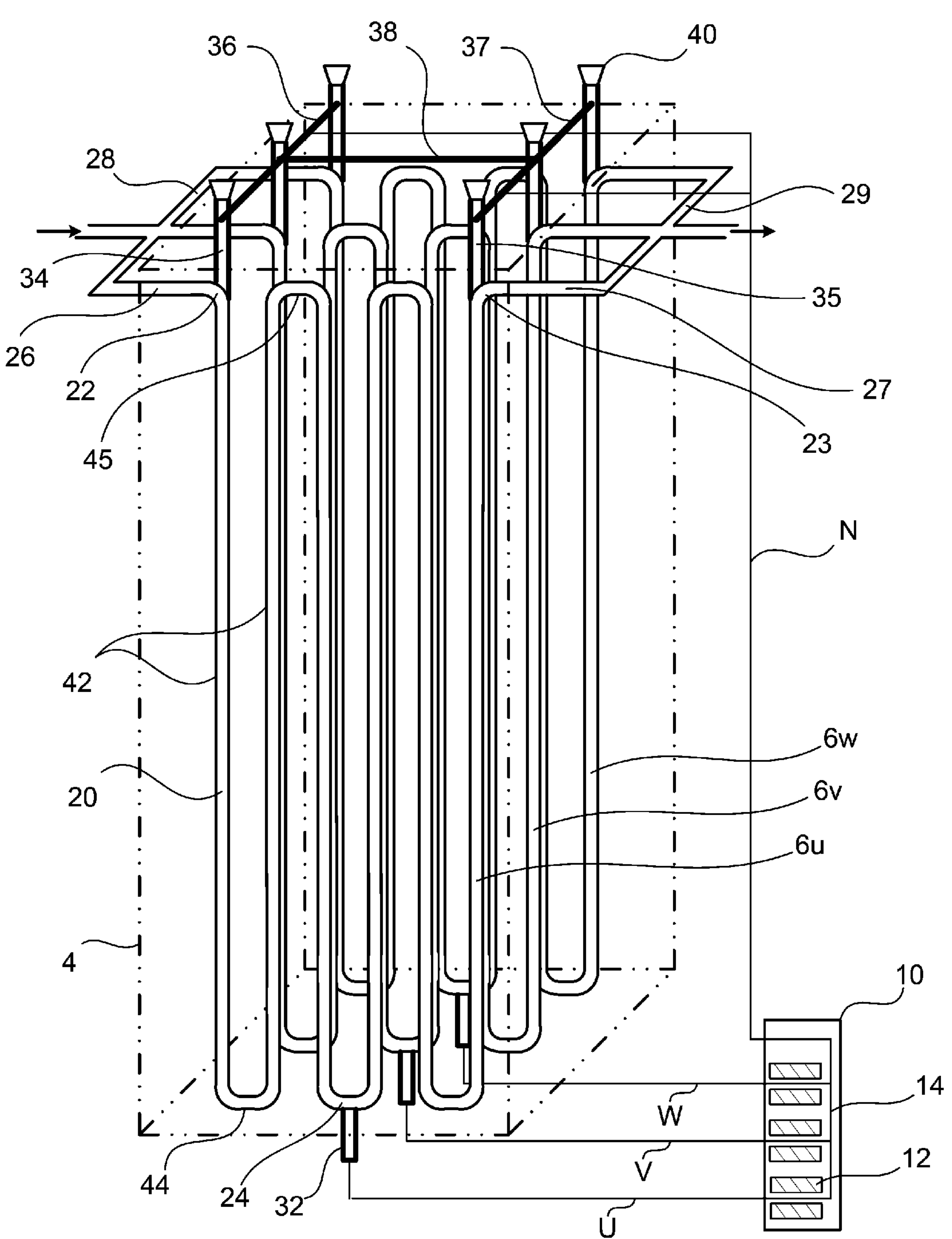
FIG. 1 shows a perspective view of a reactor connected to an alternating current source according to an embodiment of the invention.

The invention makes use of the measure of connecting each reaction tube to only one phase and establishing phase balancing via a plurality of reaction tubes. The length heated per phase, and thus the resistance, in a reaction tube is thus increased compared to an arrangement in which a reaction tube is connected to multiple phases. This enables a higher power input at constant current intensity (since $P=R \cdot I^2$, where P: power, R: resistance, i: current intensity), which can be achieved by increasing the voltage. Since there is only one current feed for each reaction tube via a respective feed element, the number of technically complex high-current feeds and the power losses occurring therein can be reduced.

The reactor for carrying out a chemical reaction in a process fluid using multiphase alternating current in order to heat the process fluid, wherein the alternating current has a number M of phases, wherein M is an integer greater than one, comprises a reactor vessel formed by a thermally insulating reactor wall and at least one group having multiple reaction tubes, wherein each group comprises M reaction tubes, each of which has an electrically heatable heating section that extends between a first and a second removal region of the respective reaction tube with a respective heating length, wherein the heating sections are arranged at least for 95% of their heating length within the reactor vessel and each have a feed region in a region which extends over 20% to 80% of the heating length of said heating section. The percentages in the specification "20% to 80%" refer to the position within the heating length, i.e. 0% denotes the position of the first (or second) removal region, 50% denotes the middle of the heating section and 100% denotes the position of the second (or first) removal region (i.e., a proportion is not meant).

At the feed regions which are connected to the power supply via the feed elements, in each case one phase of the alternating current is fed or supplied to the heating sections, i.e. an alternating voltage corresponding to the respective phase is applied. At the removal regions which are connected to the star bridges via the removal elements, the respective phase of the alternating current is removed or discharged from the heating sections. The star bridges are used to balance the different phases of the alternating current.

The fact that the reaction tubes are electrically heatable or have an electrically heatable heating section, means that the material used for the reaction tubes and in particular the heating sections is a material with an electrical conductivity suitable for electrical heating. Examples are heat-resistant steel alloys, in particular heat-resistant chromium-nickel steel alloys. Such steel alloys can also be used for the power connections (via which the electrical currents are conducted into the reactor vessel), i.e. the feed elements and the removal elements. For example, materials with the standard designations, GX40CrNiSi25-20, GX40NiCrSiNb35-25, GX45NiCrSiNbTi35-25, GX35CrNiSiNb24-24, GX45NiCrSi35-25, GX43NiCrWSi35-25-4, GX10NiCrNb32-20, GX50CrNiSi30-30, G-NiCr28 W, G-NiCrCoW, GX45NiCrSiNb45-35, GX13NiCrNb45-35, GX13NiCrNb37-25, or GX55NiCrWZr33-30-04 according to DIN EN 10027, Part 1, "Materials," may be used.

The reactor wall encloses a region which is surrounded in all spatial directions by at least one reactor wall. In general, the reactor wall is formed by multiple individual walls which are joined together in such a way that they enclose a region. Thus, it could also be referred to as a group of reactor walls, but the term "reactor wall" is used for simplicity. The enclosed region, and hence the reactor wall, can have any volumetric shape, but preferably that of a square prism. The reactor wall may have sealed structural elements (such as feedthroughs or viewing windows), but also permanently open and/or closable openings as a connection to other parts of the plant, preferably for conditioning the atmosphere within the reactor wall, e.g. inlet nozzle for inert gas or outlet opening to a chimney tract.

The reactor wall forms the reactor vessel (which may also be referred to as a reactor box), i.e. the reactor wall constitutes the wall or walls of the reactor vessel. Accordingly, the term "reactor wall" is not to be understood here as meaning a tank for the process fluid. The region enclosed by the reactor wall is the interior of the reactor vessel. In the remainder of the description, the region within the reactor vessel (i.e. in the interior of the reactor vessel) is also referred to as "within the reactor wall" for the sake of simplicity. The expression "within the reactor wall" therefore means within the region enclosed by the reactor wall. Likewise, the region outside the reactor vessel is also referred to as "outside the reactor wall".

The reactor wall reduces thermal losses and protects the surroundings of the reactor vessel or reactor from heat. Accordingly, the heating length should be substantially within the region enclosed by the reactor wall, i.e. in the interior of the reactor vessel, according to the invention at least for 95%, preferably at least for 98%, further preferably for 100% (i.e. heating sections completely within the region enclosed by the reactor wall). This arrangement is preferably symmetrical, i.e. if present (heating sections not 100% within the region enclosed by the reactor wall), those sections of the heating sections which are outside the reactor vessel are arranged symmetrically with respect to the heating length. In particular, the removal regions can lie outside the reactor wall.

The feed region is in each case preferably arranged in a region of the heating sections which extends from 30% to 70% of their heating length, further preferably in a region of the heating sections which extends from 40% to 60% of their heating length, and most preferably arranged in a region of the heating sections which extends from 45% to 55% of their heating length. This corresponds to a symmetrical division of the currents from the feed regions to the first and the second removal regions.

The reactor further comprises electrically conductive feed elements, wherein each group is paired with M feed elements which are electrically conductively connected to the feed regions of the group, wherein different phases of the alternating current are fed or can be fed into different feed elements paired with a group. The feed elements extend through the reactor wall and in principle constitute power feeds or power connections. The reactor also comprises electrically conductive first and second removal elements, each group being paired with M first removal elements and M second removal elements which are electrically conductively connected to the first removal regions or second removal regions of the group. The removal elements serve to dissipate the electrical currents supplied via the feed elements and the feed regions. The feed elements serve as high-current feeds.

The electrically conductive connection between the feed elements and the feed regions or between the removal elements and the removal regions can be made by means of a form-fitting connection or a force-fitting connection (e.g. sleeves) or an integral connection (e.g. a welded connection), with combinations being conceivable.

The reactor further comprises at least one electrically conductive first star bridge and at least one electrically conductive second star bridge, wherein each group is paired with a first and a second star bridge, wherein for each group, the first removal elements paired with the group are electrically conductively connected to the first star bridge paired with the group, and the second removal elements paired with the group are electrically conductively connected to the second star bridge paired with the group. Potential balancing between the phases is established through the star bridges.

Preferably, the at least one first and the at least one second star bridge are arranged outside the reactor vessel. One advantage of arranging the star bridges outside the reactor vessel (i.e. outside the reactor wall) is that a material with a lower heat resistance than would be necessary for an arrangement within the reactor vessel can be used there. A material with a high electrical conductivity can thus be selected, e.g. copper.

Accordingly, between different phases, i.e. between different reaction tubes, the electrical resistance across the star bridge is significantly smaller than the electrical resistance across the connection formed by fluid supply tubes connected to the reaction tubes and fluid supply manifolds or fluid discharge tubes and fluid discharge manifolds connected to the reaction tubes. Fluid supply tubes shall mean tubes through which the process fluid is supplied to the respective reaction tube; correspondingly, fluid discharge tubes shall mean tubes through which the process fluid is discharged from the respective reaction tube. Fluid supply manifolds are tubes connected to multiple supply tubes to distribute the process fluid coming from other parts of the plant to the multiple reaction tubes. Fluid discharge manifolds are tubes connected to multiple discharge tubes to collect the coming from multiple reaction tubes after the chemical reaction for further transfer to other parts of the plant. The fluid supply tubes together with the fluid supply manifolds are referred to as the fluid supply tube assembly or supply header; the fluid discharge tubes together with the fluid discharge manifolds are referred to as the fluid discharge tube assembly or discharge header. The fluid supply tube assembly and the fluid discharge tube assembly form an electrical connection between the reaction tubes that is parallel to the first and second star bridges, respectively.

Preferably, the electrical resistance between two reaction tubes in a group across the first and/or second star bridge is at most 50%, further preferably at most 25%, most preferably at most 10%, of the electrical resistance parallel thereto in terms of circuitry across the fluid supply tube assembly and/or fluid discharge tube assembly.

This is advantageous in particular because potential balancing is in this case substantially effected via the star bridges, thereby reducing the occurrence of potential differences between the fluid supply tube assembly and the fluid discharge tube assembly, which could lead to electrical currents via the parts of the plant outside the reactor.

Preferably, the first and second removal regions are arranged within the reactor vessel, wherein the first and second removal elements have an elongate shape and extend through the reactor wall; wherein further preferably the heating sections are arranged completely within the reactor vessel. Thermal losses can thus be reduced.

Preferably, if multiple groups are paired with one of the at least one first star bridge, said multiple groups are paired with the same second star bridge.

Furthermore, for one group of the at least one group, the first and the second star bridge with which this group is paired are electrically conductively connected to one another by means of a bridge connection. Possible potential differences between the star bridges can thus be balanced. This arrangement can exist for different groups if the at least one group comprises multiple groups.

The reactor preferably comprises one or more alternating current sources, wherein each alternating current source provides alternating current with M phases on M phase lines; wherein each group is paired with one of the one or more alternating current sources; wherein for each group, the feed elements paired with the group are connected to the phase lines of the alternating current source with which the group is paired.

Preferably, at least one star point is formed in at least one of the one or more alternating current sources, wherein for a group of the at least one group, the first and/or the second star bridge with which the group is paired is connected via one or more neutral conductors to the star point of the alternating current source with which the group is paired. This allows certain variations in current intensity between the phases.

Preferably, one of the one or more alternating current sources is paired with multiple groups, wherein these multiple groups are paired with the same first star bridge and the same second star bridge.

Each of the heating tube sections preferably has multiple straight tube sections connected to one another by one or more U-bends, wherein further preferably the number of tube sections is even. Thus, tube coils are formed which enable a compact design of the reactor.

The feed regions are preferably each located at one of the U-bends. Since the U-bends are located outside, close to the reactor wall, the high-current feeds formed by the feed elements can be kept relatively short.

Preferably, the removal elements are connected to electrically insulated holding devices for connection to a support structure, wherein the holding devices are connected in an electrically insulated manner to the respective removal element and/or are themselves electrically insulated. In particular, if the removal elements extend through the reactor wall, they can also assume a bearing function. The support structure is, for example, part of the production plant in which the reactor is installed.

Furthermore, for each reaction tube at least one bearing device for connection to the support structure is preferably provided, which bearing device is connected to the reaction tube, wherein the at least one bearing device is connected to the reaction tube in an electrically insulated manner and/or is itself electrically insulated and is further preferably located in one of the U-bends.

Figure 2:
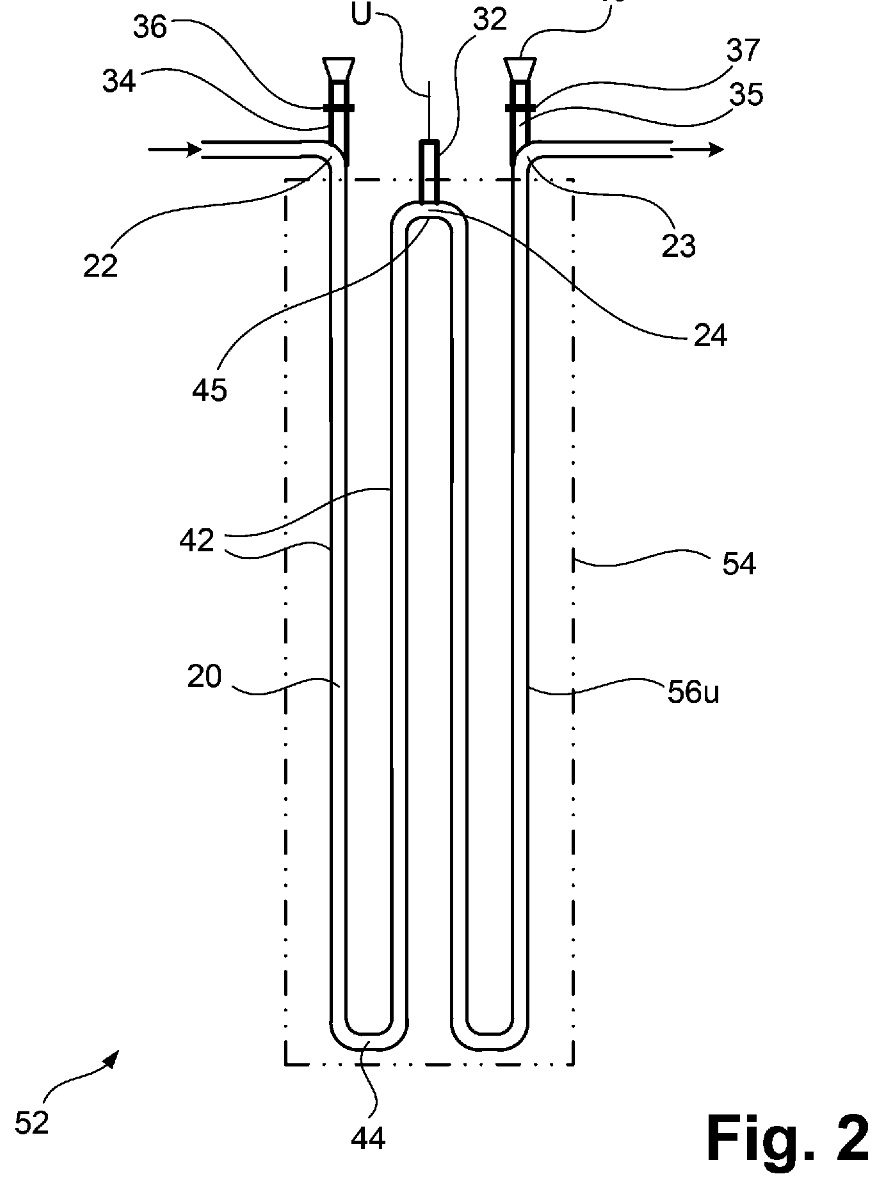
FIG. 2 shows a front view of a reactor according to another embodiment of the invention.

Preferably, all feedthroughs through the reactor wall for removal elements as well as for fluid discharge tubes and fluid supply tubes are made gas-tight by means of suitable devices, such as a sealing bellows. Such a device for gas tightness is designed to be electrically insulating so that there is no electrical contact between the component being fed through and the reactor wall. Such a device can also be provided for carrying out the current feed (i.e. for the feed elements), in particular if only small thermal balancing movements occur, for example when the current feed is arranged at the top as shown in FIG. 2.

A phase shift between two mutually different phases of the alternating current, expressed in radians, is $2\pi \cdot k/M$, where k is in each case an integer in the range from 1 to M-1. In the case of symmetrical load, the phases thus cancel one another out at the star point or in the star bridges.

The chemical reaction can be a chemical reaction that proceeds at least partially at a temperature in the range of 200° C. to 1700° C., in particular of 300° C. to 1400° C. or of 400° C. to 1100° C. The chemical reaction is preferably a chemical reaction that occurs at least partially at a temperature of at least 500° C., more preferably of at least 700° C., in particular at least partially in a temperature range of 500° C. or 700° C. to 1100° C. The electrical voltages/currents provided are therefore suitable for providing appropriate heating power. The reactor and the power source are likewise configured to carry out chemical reactions at these temperatures and to provide corresponding heating powers. Preferably, the chemical reaction is one of the following: steam cracking, steam reforming, dry reforming (carbon dioxide reforming), propane dehydrogenation, generally reactions with hydrocarbons that are carried out at least partially at over 500° C.

The invention is first described below with reference to reaction tubes and reactors as used for steam cracking or for steam reforming. However, the invention may also be used in other reactor types. Generally, as mentioned, the reactor proposed according to the invention can be used for carrying out all endothermic chemical reactions.

The invention is explained in more detail below with reference to the accompanying drawings, which illustrate embodiments of the invention.

In the figures, elements corresponding structurally or functionally to one another are indicated by identical or similar reference signs and, for the sake of clarity, are not explained repeatedly.

FIG. 1 shows a (largely) perspective view of a reactor 2 connected to an alternating current source 10 according to a preferred embodiment of the invention. The reactor 2 has a thermally insulating reactor wall 4, the contour of which is indicated in the figure as a dash-dotted line, and multiple reaction tubes 6*u*, 6*v*, 6*w*, through which the process fluid to be heated, in which the chemical reaction is to take place, flows. The reactor wall forms a reactor vessel as explained above. The reaction tubes form a group. The number of reaction tubes (in the group) corresponds to the number of phases of the alternating current source; here, for example, 3 phases, although another number greater than or equal to 2 is also possible. In general, multiple groups of reaction tubes can be provided, wherein the number of reaction tubes in each group corresponds to the number of phases. In this general case, one or more alternating current sources can be provided, wherein the phase terminals of an alternating current source can also be connected to the reaction tubes in different groups, i.e. it is possible for an alternating current source to supply alternating current to one or more groups of reaction tubes; these one or more groups are paired with the alternating current source that supplies them with alternating current.

Each of the reaction tubes 6*u*, 6*v*, 6*w* has a heating section 20 which extends between a first removal region 22 and a second removal region 23. In order to make the figure clearer, the reference signs are only used here and in the following to represent one of several similar elements. The length of the reaction tube between the first and second removal regions 22, 23, i.e. the heating section 20, is referred to as the heating length. This extends here over several turns of the tube coil, which is formed by each of the reaction tubes. The heating section 20 of each reactor tube is arranged within the reactor wall 4.

More generally, the removal regions 22, 23, unlike in FIG. 1, can also be located outside the reactor wall; in this case, which is illustrated in FIG. 2, the heating sections extend through the reactor wall (wherein the section of the heating sections located outside the reactor wall should be as small as possible in order to avoid thermal losses), wherein the heating sections should be located within the reactor wall for at least 95% of their heating length.

The reactor wall 4 forms a substantially (except for feedthroughs which serve to supply or discharge the process gas, feed or remove current and the like) closed casing, for the region of the reactor 2 through which the heating sections in which the process fluid is to be heated run, at least for the most part. The supply and removal of the process fluid is carried out by means of fluid supply tubes 26 or fluid discharge tubes 27 connected to the reaction tubes, each of which is connected to fluid supply manifolds 28 or fluid discharge manifolds 29 via which the process fluid is conducted from other production plant parts of one to the reactor and, after the chemical reaction, is discharged from the reactor to these production plant parts again. The fluid supply tubes 26 together with the fluid supply manifolds 28 form so-called supply headers (fluid supply assemblies); the fluid discharge tubes 27 together with the fluid discharge manifolds 29 form so-called discharge headers (fluid discharge assemblies).

Approximately in the middle, more generally between 20% and 80%, of the heating length between the first and second removal regions 22, 23, each reaction tube 6*u*, 6*v*, 6*w*, or its respective heating section 20 has a feed region 24. Each of the feed regions 24 is electrically conductively connected to an electrically conductive feed element 32, which in turn is electrically conductively connected to a phase or a phase line U, V, W of the alternating current source 10. The feed elements 32, which represent current terminals, so to speak, extend through the reactor wall 4 and have, for example, an elongate shape, one end of which is connected to the respective feed region 24 and the other end of which is connected to one of the phase lines U, V, W. The feed elements connected to feed regions of a group are paired with the respective group.

The alternating current source 10 preferably provides multi-phase alternating current, here three-phase alternating current, with a predetermined alternating voltage. More generally, a different number M of phases is also conceivable. The phase shifts between the phases are preferably selected such that the voltages or currents cancel one another out at a star point, i.e., the phase shift between two arbitrary phases can be expressed in radians as $2\pi \cdot k/M$, or in degrees as 360° k/M, where k is an integer in the range of 1 to M-1. In the case of three phases, therefore $2\pi/3$ or $4\pi/3$, corresponding to 120° or 240°. The phase difference between two successive phases is in this case obtained with k=1, i.e., as $2\pi/M$.

The alternating current source 10 can be designed as an alternating current transformer, in particular as a high-current transformer. The primary side, i.e. the alternating current supply to the power source 10, for example from a public supply network or a generator, is shown here merely in the form of shaded boxes which symbolize primary-side transformer coils 12. Primary-side power supply lines are not shown in the figure. A primary-side alternating voltage can typically be a few hundred to a few thousand volts, e.g., 400 V, 690 V or 1.2 kV. Between the primary side of the power source 10 and a possibly public supply network or a generator, at least one further transformer (not shown; possibly at least one regulating transformer that makes it possible to control the secondary-side AC voltage or to adjust it within a certain voltage range) may be interposed in order to obtain a suitable input voltage for the high-current transformer. Instead of or in addition to this interposed, at least one transformer, the input voltage can also be set by means of one or more thyristor power controllers.

On the secondary side, phase lines or phase terminals U, V, W are provided, on which the phases of the alternating current are provided. The phase lines U, V, W are supplied with electrical energy via secondary-side transformer coils not shown in detail (it is only shown that the phase lines extend through the primary-side transformer coils 12 in order to indicate that they electromagnetically interact with one another). The secondary-side alternating voltage can expediently lie in the range up to 300 V, for example less than 150 V or less than 100 V, even less than or equal to 50 V. The secondary side is galvanically separated from the primary side.

The phase lines U, V, W are connected to one another in the alternating current source 10, such that a star point 14 of the alternating current source 10 is formed. Grounding of this star point 14 is preferably dispensed with. The star point 14 is optionally connected to a neutral conductor N.

The first removal regions 22 are electrically conductively connected to electrically conductive first removal elements 34, which in turn are electrically conductively connected to one another by an electrically conductive first star bridge 36. The second removal regions 23 are electrically conductively connected to electrically conductive second removal elements 35, which in turn are electrically conductively connected to one another by an electrically conductive second star bridge 37. The removal elements that are connected to removal areas of a group are paired with the respective group.

Preferably, the first and second removal elements 34, 35 extend through the reactor wall 4, wherein further preferably (as shown in FIG. 1) the first and the second star bridge 36, 37 are located outside the reactor wall. If the removal regions are outside the reactor wall, the removal elements 34, 35 do not extend through the reactor wall.

Furthermore, holding devices 40 connected to the removal elements 34, 35 are preferably provided, and are connected to the removal elements 34, 35 in an electrically insulating manner and/or are themselves electrically insulating. The removal elements can in this case have an elongate shape, wherein a removal end of the removal elements is connected to a removal region and an opposite holding end is connected to a holding device. The holding devices 40 are configured to be connectable to a support structure (not shown) of the production plant in which the reactor is installed. They therefore serve in particular to hold or bear the reactor tubes (and elements connected to them). Additionally or alternatively, bearing devices (not shown) connected to the heating sections 20 can be provided, which bearing devices are connected to the heating sections 20 in an electrically insulated manner and/or themselves are electrically insulating and extend through the reactor wall in order to be connected to the support structure, such that the reactor tubes are held by means of the bearing devices.

The alternating current is thus fed or introduced via the feed regions 24 into the heating sections 20 and removed from the latter via the removal regions 22, 23. Starting from the feed region 24 of a heating section 20, the electric current flows according to the respective electrical resistances firstly to the first removal region 22 and secondly to the second removal region 23. Since the different reaction tubes 6*u*, 6*v*, 6*w* are fed with different phases U, V, W of the alternating current, potential balancing occurs ideally (i.e. with symmetrical load) in the two star bridges 36, 37 when there is a corresponding phase shift between the phases. In terms of circuitry, the star bridges form consumer-side star points.

Optionally, one neutral conductor N or multiple neutral conductors are provided, via which the star bridges 36, 37 are electrically conductively connected to the alternating current source 10.

Preferably, at least one electrically conductive bridge connection 38 is also provided, which is electrically conductively connected both to the first star bridge 36 and to the second star bridge 37.

The reaction tubes 6*u*, 6*v*, 6*w* shown in FIG. 1 or their heating sections 20 are designed as tube coils, i.e. comprise straight tube sections 42 which are connected to one another via lower U-bends 44 and upper U-bends 45. In the embodiment shown, the feed regions 24 are each provided at a lower U-bend. The first and second removal regions 22, 23 are arranged here by way of example at the upper ends of tube sections 42 in elbow regions in which the corresponding tube sections 42 overlap into the fluid supply tubes 22 and fluid discharge tubes 23 respectively. However, it is also possible to provide the removal regions and the feed regions in other regions of the tube coil.

In the example shown, the length of the sections between the feed region 24 and the first or second removal region 22, 23 comprises three straight tube sections in each case and is thus significantly longer than in the case of a pipeline (as in the prior art) which is connected to three phases, more precisely to one phase at each lower U-bend, and in which the straight tube sections are electrically conductively connected to one another at their opposite ends. That is, the length of a reaction tube connected to one phase is about three times as long and has a correspondingly higher resistance. At a constant current intensity, a correspondingly higher heating power is thus produced per phase and reaction tube, and in particular fewer high-current feeds are necessary.

The terms "top"/"bottom" refer only to the orientation in the figure, i.e. they serve to distinguish the corresponding U-bends. The actual orientation (i.e. with respect to the earth's gravitational field) of the tube coils can also be different, e.g., the tube coils could be laid down (tube sections run horizontally) or the arrangement could be upside down compared to the one shown (removal elements, star bridges and supply/discharge headers at the bottom; feed elements at the top).

In FIG. 1, each of the reactor tubes 6*u*, 6*v*, 6*w* or each heating section 20 has 6 straight tube sections 42 by way of example, i.e. is divided into 3 U-shaped sections which are connected to one another via the upper U-bends 45. A different number is also possible here, for example 2 straight tube sections (1 U-shaped section), 4 straight tube sections (2 U-shaped sections; see FIG. 2), 8 straight tube sections (2 U-shaped sections), etc. In principle, an odd number of straight tube sections is also possible; see FIG. 3.

In FIG. 1, in each heating section 20, the feed region 24 is located exactly in the middle of the heating length between the first removal region 22 and the second removal region 23. Here too, deviations are possible, i.e. the length (first heating length) of the heating section (first heating section) between the first removal region 22 and the feed region 24 can differ from the length (second heating length) of the heating section (second heating section) between the feed region 24 and the second removal region 23. The electrical current is then divided according to the electrical resistances of these two sections (first/second heating section), such that different heating powers can be achieved in the two sections.

FIG. 1 shows only one group with multiple (three, as an example) reaction tubes. In general, a reactor can comprise a plurality of such groups, wherein one or more alternating current sources can be provided, each of which provides alternating current for one or more groups, respectively, i.e. one or more groups are paired with the same alternating current source. Multiple first star bridges and multiple second star bridges can also be provided, wherein a single first/second star bridge can be connected to removal elements which are paired with different groups, i.e. these different groups are paired with the same first/second star bridge, wherein preferably groups which are paired with the same first star bridge are also paired with the same second star bridge. Preferably, if multiple groups are paired with the same alternating current source, these multiple groups should also be paired with the same first star bridge and the same second star bridge.

FIG. 2 illustrates a front view of a reactor 52 according to a further preferred embodiment of the invention. This figure, like FIG. 3, serves to illustrate different designs of reaction tubes or tube coils and corresponding connection options for the power supply, and therefore only one of the reaction tubes and the connections thereto are shown. The other reaction tubes (corresponding to the number of phases of the alternating current source), which are in principle arranged perpendicular to the drawing plane at a distance from the reaction tube shown ("displaced in parallel"), are designed in the same way as shown, with the difference that their feed regions are connected to different phases. Details or properties of the elements are not repeated below, unless different from those in FIG. 1; the explanations in connection with the description of FIG. 1 apply here.

The reactor 52 again has a reactor wall 54 and reaction tubes (arranged in a direction perpendicular to the drawing plane), with only one reaction tube 56*u* being visible in the front view as a representative example. Each of the reaction tubes 56*u* has a heating section 20 with a heating length which extends between a respective first removal region 22, which is connected to a first removal element 34, and a respective second removal region 23, which is connected to a second removal element 35. The first removal elements 34 are connected by a first star bridge 36 which extends perpendicular to the drawing plane; the second removal elements 35 are connected by a second star bridge 37 which likewise extends perpendicular to the drawing plane.

Each reaction tube 56*u* or each heating section consists of straight tube sections 42 which are connected to one another by lower U-bends 44 and an upper U-bend 45 to form a tube coil which consists of 4 straight tube sections (2 U-shaped sections); similar arrangements are also possible with another number of tube sections, for example with 8 or 12 straight tube sections (4 or 6 U-shaped sections), etc.

In contrast to FIG. 1, the feed region 24 is not located in this case in a lower U-bend but in the upper U-bend 45, i.e. again in the middle of the heating section. That is to say, the removal regions 22, 23 and the feed regions 24 are located on the same side (top) of the reactor. The feed region 24 of the reactor tube 56*u* visible here is connected to a phase line U of an alternating current source (not shown in more detail). Accordingly, the feed regions of the other, non-visible reactor tubes are connected to other phase lines of the alternating current source. Potential balancing of the different phases again takes place across the star bridges 36, 37, such that the star bridges again form consumer-side star points in terms of circuitry.

Regardless of the shape of the tube coils, in the embodiment of FIG. 2, the first and second removal regions 22, 23 are located outside the reactor wall 54. Of course, a configuration as in FIG. 1 is also possible, in which the removal regions are located within the reactor wall.

Again, an electrically conductive bridge connection which is electrically conductively connected both to the first star bridge 36 and to the second star bridge 37, and/or one or more neutral conductors connecting the star bridges to the star point of the alternating current source, can also be provided. Likewise, holding devices 40 and/or bearing devices can be provided. These elements are for the most part not shown in FIG. 2.

Figure 3:
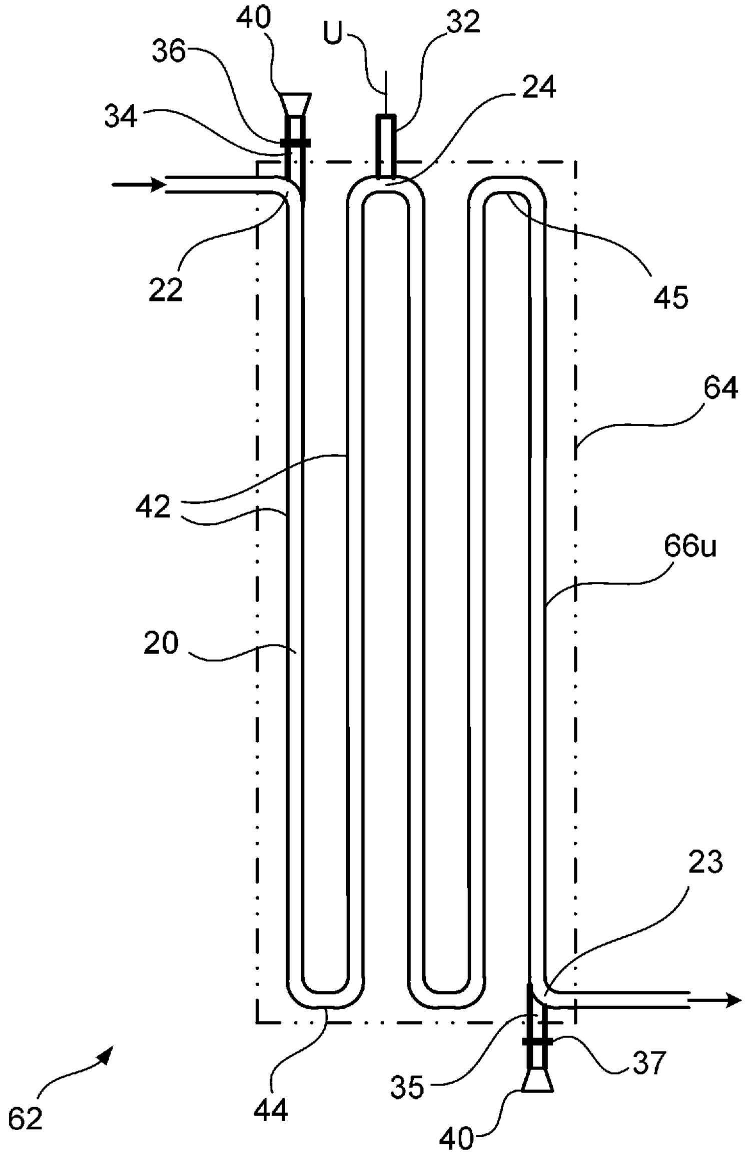
FIG. 3 shows a front view of a reactor according to still another embodiment of the invention.

FIG. 3 illustrates a front view of a reactor 62 according to a further preferred embodiment of the invention. This figure, like FIG. 2, serves to illustrate different designs of reaction tubes or tube coils and corresponding connection options for the power supply, and therefore only one of the reaction tubes and the connections thereto are shown. The other reaction tubes (corresponding to the number of phases of the alternating current source), which are in principle arranged perpendicular to the drawing plane at a distance from the reaction tube shown ("displaced in parallel"), are designed in the same way as shown, with the difference that their feed regions are connected to different phases. Details or properties of the elements are not repeated below, unless different from those in FIG. 1; the explanations in connection with the description of FIG. 1 apply here.

The reactor 62 again has a reactor wall 64 and reaction tubes (arranged in a direction perpendicular to the drawing plane), with only one reaction tube 66*u* being visible in the front view as a representative example. Each of the reaction tubes 66*u* has a heating section 20 with a heating length which extends between a respective first removal region 22, which is connected to a first removal element 34, and a respective second removal region 23, which is connected to a second removal element 35. The first removal elements 34 are connected by a first star bridge 36 which extends perpendicular to the drawing plane; the second removal elements 35 are connected by a second star bridge 37 which likewise extends perpendicular to the drawing plane.

Each reaction tube 66*u* or each heating section consists of straight tube sections 42 connected to one another by lower U-bends 44 and upper U-bends 45 to form a tube coil. In contrast to the previous embodiments, an odd number of straight tube sections 42 is provided (here, for example, 5, although another odd number is also conceivable). On the one hand, this leads to the first removal regions 22 (and accordingly the first removal elements 34) being arranged at the top, while the second removal regions 23 (and accordingly the second removal elements 35) are arranged at the bottom. See the above explanations for the terms "bottom"/"top".

On the other hand, this also leads to the feed region 23, which is again arranged in a U-bend (by way of example in an upper U-bend 45, although an arrangement in a lower U-bend 44 is likewise possible), not being located in the middle of the heating section 20, i.e. not at 50% of the heating length. Rather, the length of the section between the feed region 23 and the first removal region 22 is somewhat shorter than the length of the section between the feed region 23 and the second removal region 24. In principle, it would also be possible (in all embodiments) to arrange the feed region in a straight tube section, but the arrangement in a U-bend is preferred since this generally means that the length, and thus the resistance, of the feed elements, which have to conduct electrical currents with high current intensity (e.g. several kA), can be kept relatively low, resulting in a correspondingly high power loss.

The removal regions of the embodiment of FIG. 3 are located within the reactor wall 54, such that the removal elements extend through the reactor wall, although an embodiment in which the removal regions are arranged outside the reactor wall is clearly also conceivable.

Again, one or more neutral conductors connecting the star bridges to the star point of the alternating current source may be provided (not shown in FIG. 3). Likewise, holding devices 40 and/or bearing devices (not shown) can be provided.

The invention claimed is:

1. A reactor for carrying out a chemical reaction in a process fluid using multiphase alternating current in order to heat the process fluid, wherein the alternating current has a number M of phases, wherein M is an integer greater than one, comprising:

a reactor vessel formed by a thermally insulating reactor wall;

at least one group having multiple reaction tubes, wherein each group comprises M reaction tubes, each of which has an electrically heatable heating section that extends between a first and a second removal region of the respective reaction tube for a respective heating length, wherein the heating sections are arranged at least for 95% of their heating length within the reactor vessel and each have a feed region in a region which extends over 20% to 80% of the heating length of said heating section;

electrically conductive feed elements, wherein each group of reaction tubes is paired with feed elements which are electrically conductively connected to the feed regions of the group, and different phases of the alternating current can be fed to different feed elements paired with a respective group;

electrically conductive first and second removal elements, each group being paired with M first removal elements and M second removal elements which are electrically conductively connected to the first removal regions or second removal regions of the group; and at least one electrically conductive first star bridge and at least one electrically conductive second star bridge, wherein each group is paired with a respective first and a second star bridge, wherein for each group, the first removal elements paired with the group are electrically conductively connected to the first star bridge paired with the group, and the second removal elements paired with the group are electrically conductively connected to the second star bridge paired with the group.

2. The reactor according to claim 1, wherein the at least one first and the at least one second star bridge are arranged outside the reactor vessel.

3. The reactor according to claim 2, wherein the first and second removal regions are arranged within the reactor vessel, and wherein the first and second removal elements have an elongate shape and extend through the reactor wall; wherein the heating sections are arranged completely within the reactor vessel.

4. The reactor according to claim 3, wherein, if multiple groups are paired with one of the at least one first star bridge, the multiple groups are paired with the same second star bridge.

5. The reactor according to claim 4, wherein, for one group of the at least one group, the first and the second star bridge with which this group is paired are electrically conductively connected to one another by means of a bridge connection.

6. The reactor according to claim 5, further comprising one or more alternating current sources, wherein each alternating current source provides alternating current with M phases on M phase lines; wherein each group is paired with one of the one or more alternating current sources; wherein for each group, the feed elements paired with the group are connected to the phase lines of the alternating current source with which the group is paired.

7. The reactor according to claim 6, wherein at least one star point is formed in at least one of the one or more alternating current sources, wherein for a group of the at least one group, the first and/or the second star bridge with which the group is paired is connected via one or more neutral conductors (to the star point of the alternating current source with which the group is paired.

8. The reactor according to claim 6, wherein one of the one or more alternating current sources is paired with multiple groups, wherein these multiple groups are paired with the same first star bridge and the same second star bridge.

9. The reactor according to claim 8, wherein each of the heating sections has multiple straight tube sections connected to one another by one or more U-bends.

10. The reactor according to claim 9, wherein the feed regions are each located at one of the U-bends.

11. The reactor according to claim 10, wherein the removal elements are connected to electrically insulated holding devices for connection to a support structure, wherein the holding devices are connected in an electrically insulated manner to the respective removal element and/or are themselves electrically insulated.

12. The reactor according to claim 1, wherein the removal elements are connected to electrically insulated holding devices for connection to a support structure, wherein the holding devices are connected in an electrically insulated manner to the respective removal element and/or are themselves electrically insulated.

13. The reactor according to claim 12, wherein for each reaction tube at least one bearing device for connection to the support structure is provided, which bearing device is connected to the reaction tube, wherein the at least one bearing device is connected to the reaction tube in an electrically insulated manner and/or is itself electrically insulated.

14. The reactor according to claim 12, wherein a phase shift between two mutually different phases of the alternating current, expressed in radians, is $2\pi \cdot k/M$, where k is in each case an integer in the range from 1 to M-1.

15. The reactor according to claim 12, wherein the chemical reaction is a chemical reaction that occurs at least partially at a temperature of at least 500° C.; wherein the chemical reaction is selected from a group consisting of: steam cracking, steam reforming, dry reforming, propane dehydrogenation, and a reaction with hydrocarbons, which is carried out at least partially at more than 500° C.

16. The reactor according to claim 1, wherein, if multiple groups are paired with one of the at least one first star bridge, the multiple groups are paired with the same second star bridge.

17. The reactor according to claim 1, wherein, for one group of the at least one group, the first and the second star bridge with which this group is paired are electrically conductively connected to one another by means of a bridge connection.

18. The reactor according to claim 1, further comprising one or more alternating current sources, wherein each alternating current source provides alternating current with M phases on M phase lines; wherein each group is paired with one of the one or more alternating current sources; wherein for each group, the feed elements paired with the group are connected to the phase lines of the alternating current source with which the group is paired.

19. The reactor according to claim 18, wherein at least one star point is formed in at least one of the one or more alternating current sources, wherein for a group of the at least one group, the first and/or the second star bridge with which the group is paired is connected via one or more neutral conductors to the star point of the alternating current source with which the group is paired.

20. The reactor according to claim 18, wherein one of the one or more alternating current sources is paired with multiple groups, wherein these multiple groups are paired with the same first star bridge and the same second star bridge.

* * * * *